(12) United States Patent
Eugler

(10) Patent No.: US 11,305,400 B2
(45) Date of Patent: Apr. 19, 2022

(54) DEVICE FOR PROCESSING A WORKPIECE

(71) Applicant: zwo17 GmbH & Co. KG, Markt Indersdorf (DE)

(72) Inventor: Norbert Eugler, Karlsfeld (DE)

(73) Assignee: zwo17 GmbH & Co. KG, Markt Indersdorf (DE)

( * ) Notice: Subject to any disclaimer, the term of this patent is extended or adjusted under 35 U.S.C. 154(b) by 0 days.

(21) Appl. No.: 17/288,386

(22) PCT Filed: Oct. 10, 2019

(86) PCT No.: PCT/DE2019/000261
§ 371 (c)(1),
(2) Date: Apr. 23, 2021

(87) PCT Pub. No.: WO2020/083416
PCT Pub. Date: Apr. 30, 2020

(65) Prior Publication Data
US 2021/0362293 A1 Nov. 25, 2021

(30) Foreign Application Priority Data

Oct. 26, 2018 (DE) ..................... 10 2018 008 428.1

(51) Int. Cl.
*B24B 41/06* (2012.01)
(52) U.S. Cl.
CPC ................... *B24B 41/06* (2013.01)
(58) Field of Classification Search
CPC .. B23P 19/04; B25B 1/103; B25B 1/18; B25J 15/0019; B25J 15/0052; B25J 15/0057; B25J 15/0061; B25J 15/00616; B25J 15/009; B25J 15/10; B25J 15/08; B25J 15/103; B25J 15/106; B24B 41/06; B24B 51/00
See application file for complete search history.

(56) References Cited

U.S. PATENT DOCUMENTS

| | | | |
|---|---|---|---|
| 4,741,568 A | 5/1988 | Borcea et al. | |
| 5,645,793 A | 7/1997 | Yamamoto et al. | |
| 8,123,234 B2 | 2/2012 | Tomita et al. | |
| 10,011,022 B1* | 7/2018 | Lin | ........................ B25J 15/0061 |
| 10,376,954 B2 | 8/2019 | Infanger et al. | |

(Continued)

FOREIGN PATENT DOCUMENTS

DE 10 2009 025 811 A1 11/2010
DE 20 2013 105 910 U1 3/2015
(Continued)

OTHER PUBLICATIONS

International Preliminary Report on Patentability in PCT/DE2019/00261 dated Feb. 10, 2021 with English translation.
(Continued)

*Primary Examiner* — Joel D Crandall
(74) *Attorney, Agent, or Firm* — Collard & Roe, P.C.

(57) ABSTRACT

A device is proposed for machining a workpiece using a robot which holds and moves the workpiece, in which the robot has a drive unit which is suitable for fixing the workpiece in a clamping device. According to the method the workpiece is placed in a clamping device by a robot and then machined after the workpiece has been fixed in the clamping device by means of the robot.

7 Claims, 5 Drawing Sheets

(56) References Cited

U.S. PATENT DOCUMENTS

Figure 1:
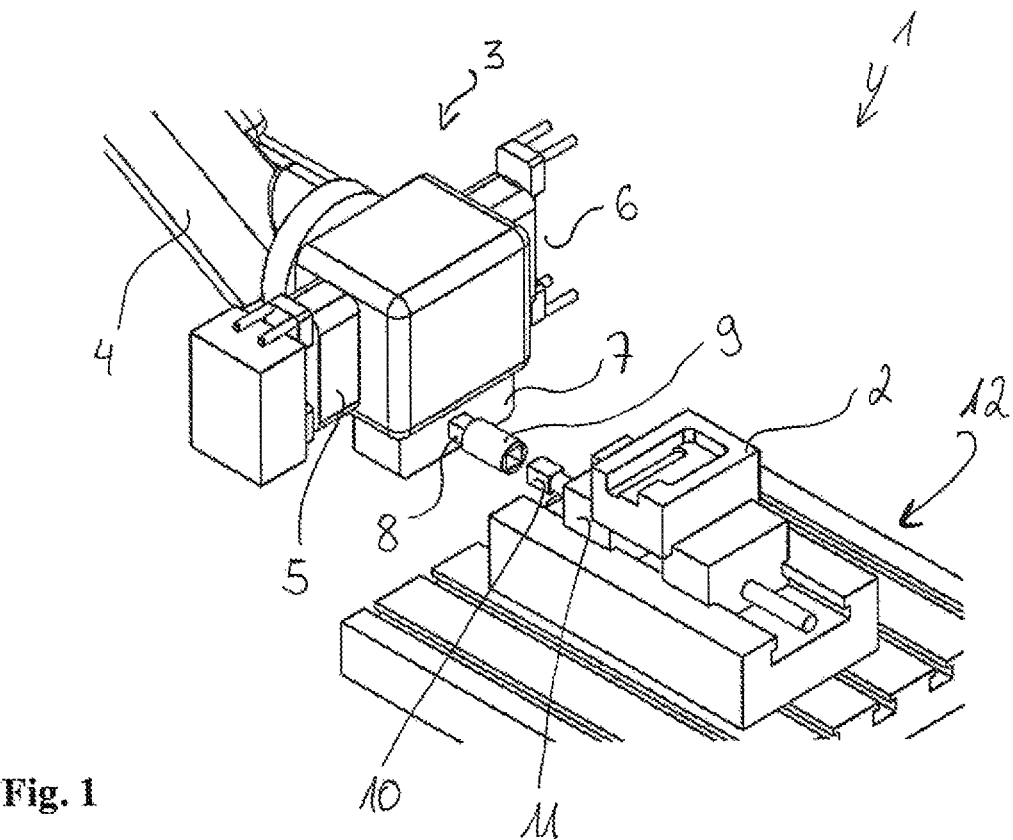

| | | | | |
|---|---|---|---|---|
| 2008/0237400 A1* | 10/2008 | Gryniewski | ............. | B64G 4/00 |
| | | | | 244/172.2 |
| 2011/0048649 A1* | 3/2011 | Komatsu | ............... | B23P 19/069 |
| | | | | 157/1.35 |
| 2018/0085916 A1 | 3/2018 | Matsumoto | | |

FOREIGN PATENT DOCUMENTS

| | | |
|---|---|---|
| DE | 10 2016 220177 A1 | 4/2018 |
| EP | 2 546 027 A1 | 1/2013 |
| JP | H0839233 A | 2/1996 |
| WO | 02/100600 A1 | 12/2002 |
| WO | 2015/003829 A1 | 1/2015 |
| WO | 2015/173239 A1 | 11/2015 |

OTHER PUBLICATIONS

International Search Report in PCT/DE2019/000261, dated Feb. 25, 2020.

* cited by examiner

DEVICE FOR PROCESSING A WORKPIECE

CROSS REFERENCE TO RELATED APPLICATIONS

This application is the National Stage of PCT/DE2019/000261 filed on Oct. 10, 2019, which claims priority under 35 U.S.C. § 119 of German Application No. 10 2018 008 428.1 filed on Oct. 26, 2018, the disclosure of which is incorporated by reference. The international application under PCT article 21(2) was not published in English.

The invention relates to a device for machining a workpiece, an arrangement comprising such a device and a clamping device, and a method for machining a workpiece using such an arrangement.

In particular, the invention relates to a device for machining a workpiece using a robot which has an arm, wherein the robot holds and moves the workpiece, wherein the robot has a drive unit which is suitable for fastening the workpiece in a clamping device. It is known to hold a workpiece with a robot and move it to a location at which the workpiece can, for example, be machined. For this purpose, a gripping device is usually provided on the arm of a robot.

The invention is based on the object of further developing such a device.

This object is achieved using a generic device in which a drive unit and at least one gripper are arranged simultaneously on the arm of the robot in order to use these one after the other, at least one gripper is arranged laterally to the drive unit and gripper and drive unit are arranged orthogonally to one another, wherein the drive unit has pins in each case on one side of a screwdriver which are configured so that they can be aligned flush with bores on the clamping device or bores are provided in the drive unit which cooperate with pins in the clamping device so that the pins slide into the bores and hold the drive unit firmly relative to the clamping device in order to relieve the stress on the robot arm.

This object is achieved using a generic device in which a drive unit and at least one gripper are arranged simultaneously on the arm of the robot in order to use these one after the other, at least one gripper is arranged laterally to the drive unit and gripper and drive unit are arranged orthogonally to one another, wherein the drive unit has pins in each case on one side of a screwdriver which are configured so that they can be aligned flush with bores on the clamping device or bores are provided in the drive unit which cooperate with pins in the clamping device so that the pins slide into the bores and hold the drive unit firmly relative to the clamping device in order to relieve the stress on the robot arm.

Clamping devices in order to fix workpieces certainly exist and there are robots which move a workpiece to a certain location. The person skilled in the art for robots has the task of positioning the workpiece in order to machine it. The workpiece is usually held by a clamping device which is actuated manually or automatically.

Starting from this prior art, the inventor has identified that the robot can also be fitted so that it operates a mechanical clamping device and thus not only positions the workpiece but also clamps it.

In order to achieve this in a simple manner, it is proposed that the robot has a gripper and a drive unit. In addition, the robot has an arm on which the drive unit and at least one gripper are arranged.

In this case, gripper and drive unit can be fastened simultaneously to the arm and used successively.

Since the drive unit has a screwdriver, a clamping device can be operated in a screwing manner with the drive unit in order to fix the workpiece in the clamping device.

In order in particular to position gripper and drive unit in a simple manner on the arm of a robot, it is proposed that at least one gripper is arranged laterally to the drive unit.

In this case, gripper and drive unit are arranged orthogonally with respect to one another.

The object forming the basis of the invention is also achieved by an arrangement comprising such a device and a clamping device in which the clamping device is configured mechanically without a drive and the clamping device and a stationary part of the drive unit are connected positively to one another. This has the advantage that a simple clamping device can be used which does not need to be operated manually by the user but can at least also be operated by a robot.

Such a clamping device can also be equipped in a simple manner so that it receives several workpieces which are clamped together.

In order to operate the clamping device by means of a drive unit in a simple manner, it is proposed that the clamping device and a moving part of the drive unit are positively connected to one another.

If the drive unit on the robot arm transmits a torque to the clamping device via a screwdriver in order to implement a clamping process on the clamping device, there is a risk that the drive unit is turned with the rotational movement. Thus, it is advantageous if the clamping device and a stationary part of the drive unit are connected positively to one another. This makes it possible, for example, with pins on the robot arm which engage in recesses on the clamping device, to hold the robot arm firmly relative to the clamping device and to turn an element on the clamping device by means of a screwdriver in order to clamp the workpiece. The positive connection allows the robot arm to be connected to the clamping device in order to allow a torque to act and then withdraw the robot arm from the clamping device again.

In an arrangement comprising a drive unit and a clamping device, the clamping device and a moving part of the drive unit can be connected positively and the drive unit can be fastened detachably to the clamping device. In this case, the drive unit is preferably arranged so that it is fixed in a stationary manner relative to the clamping device and it can be simply removed again from the clamping device, for example, by means of a screw connection. A moving part of the drive unit is in this case connected positively to the clamping device in order to automatically operate the clamping device. In this case, the drive unit can be triggered by the robot arm or by a common controller in order to clamp or release the workpiece in the clamping device.

According to the method, the object forming the basis of the invention is achieved with a method for machining a workpiece using a robot such arrangements in which the workpiece is placed in a clamping device by the robot and is then machined. According to the invention, the workpiece is fixed in the clamping device by means of the robot. Preferably the workpiece can also be released from the clamping device again by means of the robot.

When tightening the square on the clamping device, the drive unit clamps the workpiece and this is immediately thereafter braced so that the adapter can no longer be withdrawn from the clamping device. Thus, it is proposed that the bracing of the adapter is reduced by counter-turning somewhat without the clamping device being released again so that it can be easily removed from the square.

Exemplary embodiments according to the invention are show in the drawings by means of schematic views and are described in detail hereinafter.

In the figures

Figure 2:
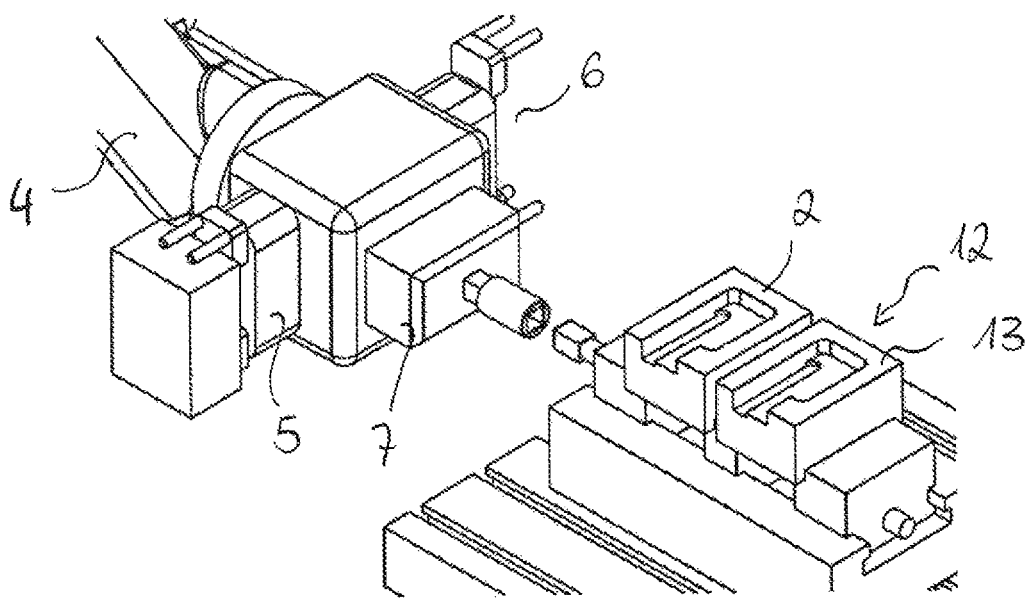
Figure 3:
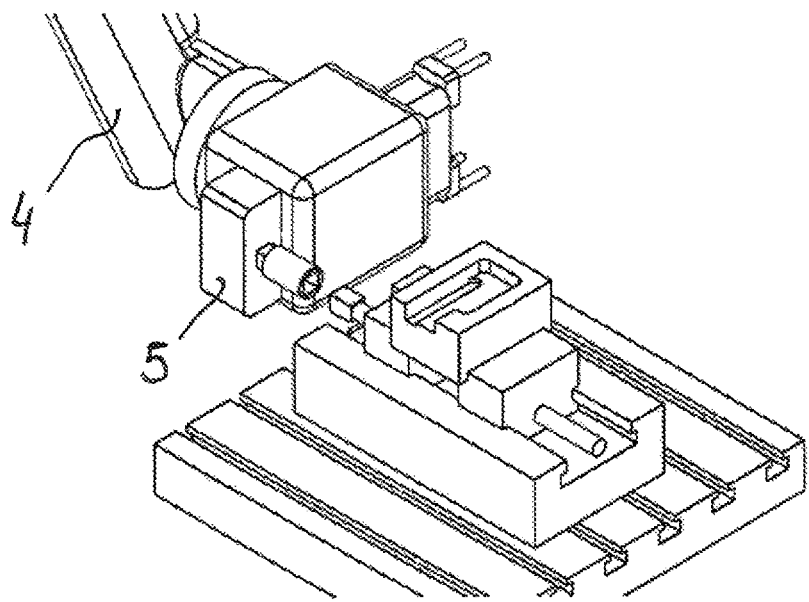
Figure 4:
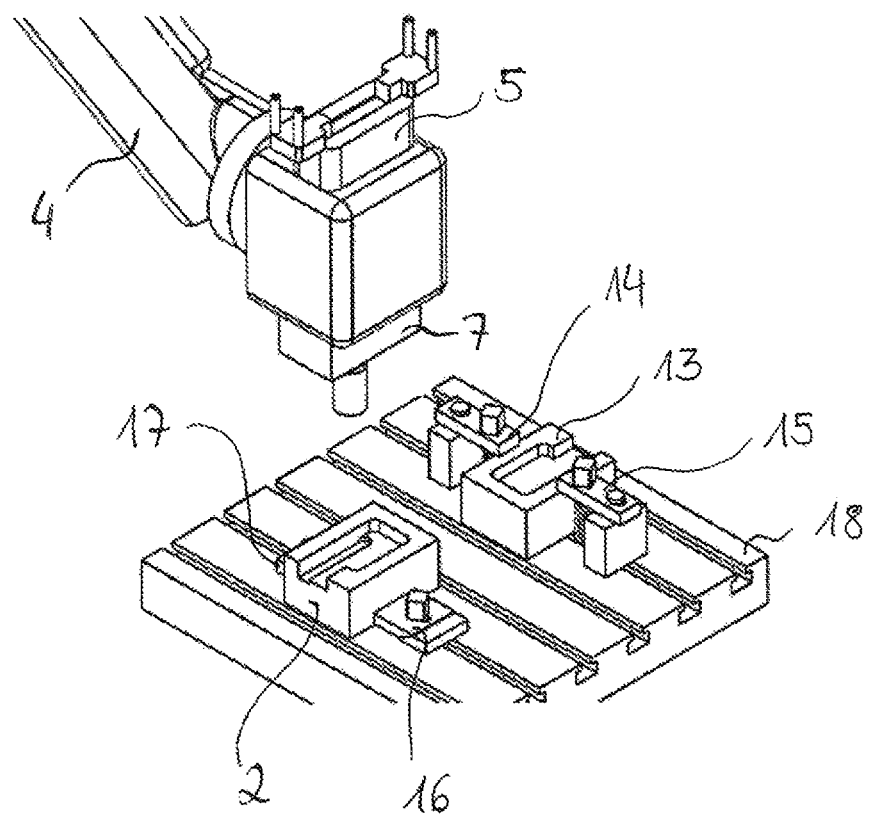
Figure 5:
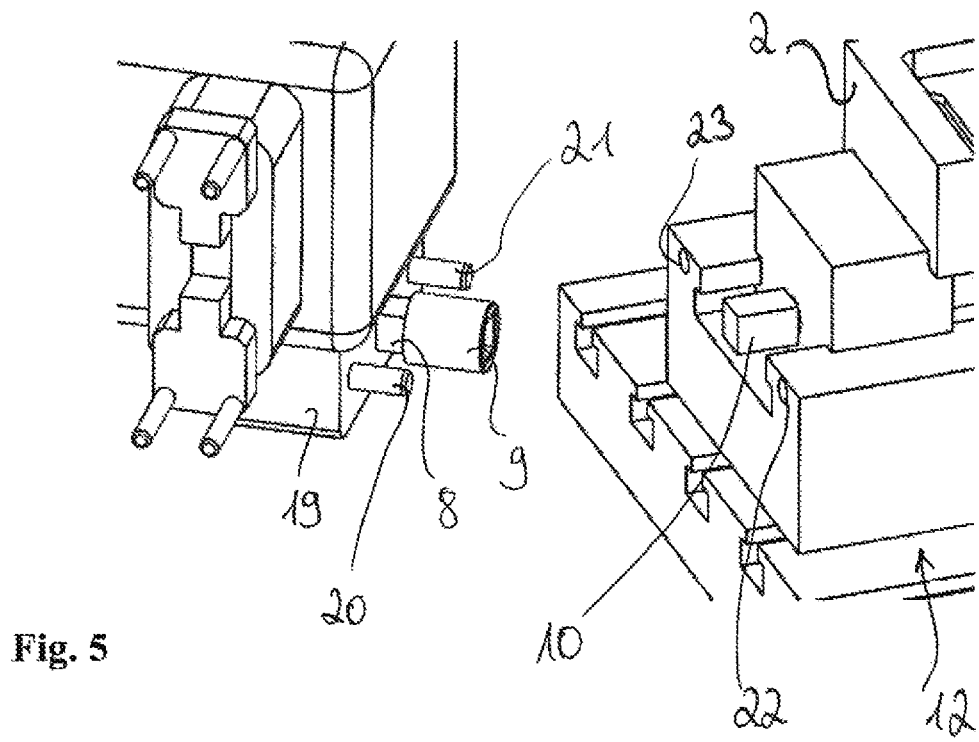
Figure 6:
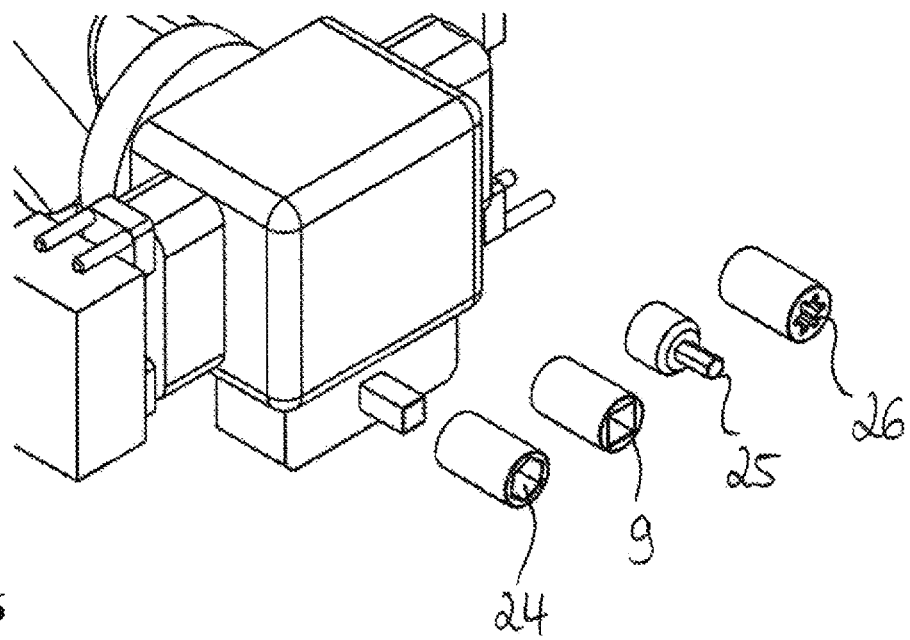
Figure 7:
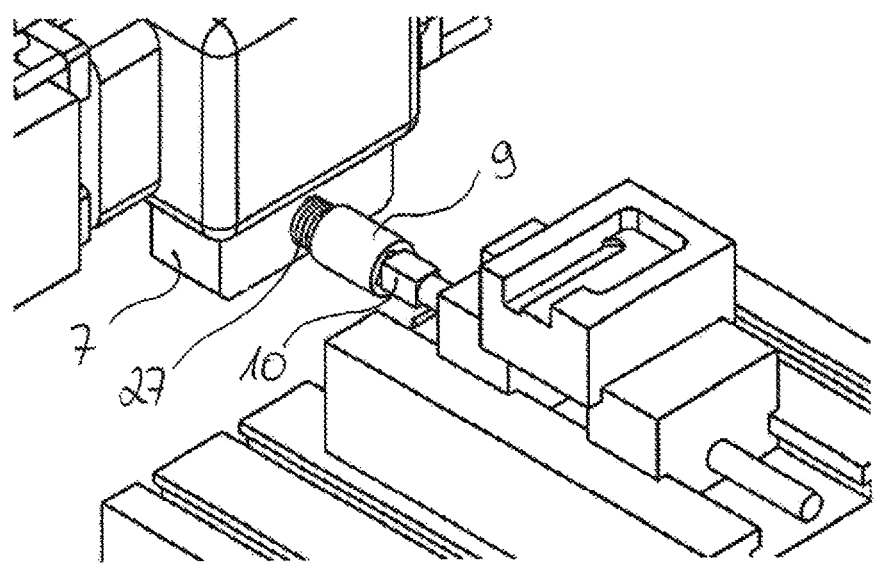
Figure 8:
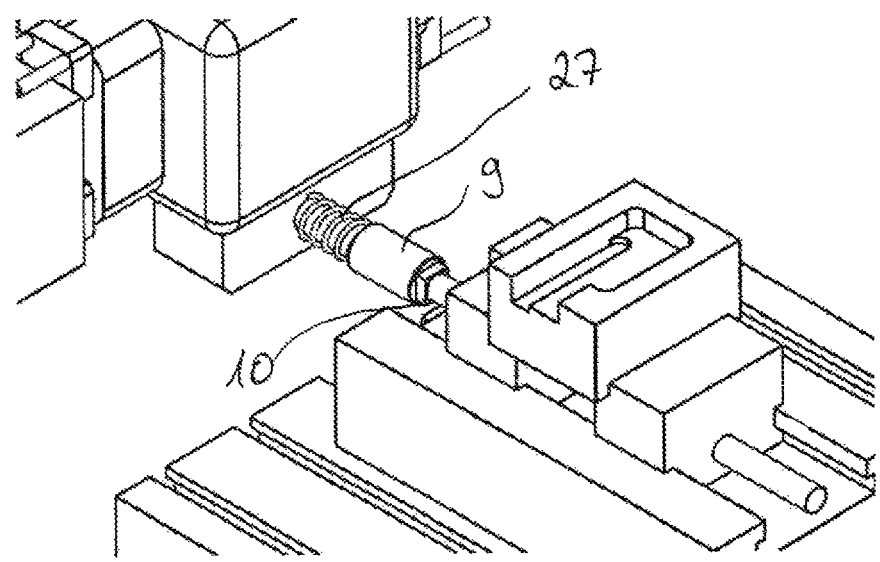
Figure 9:
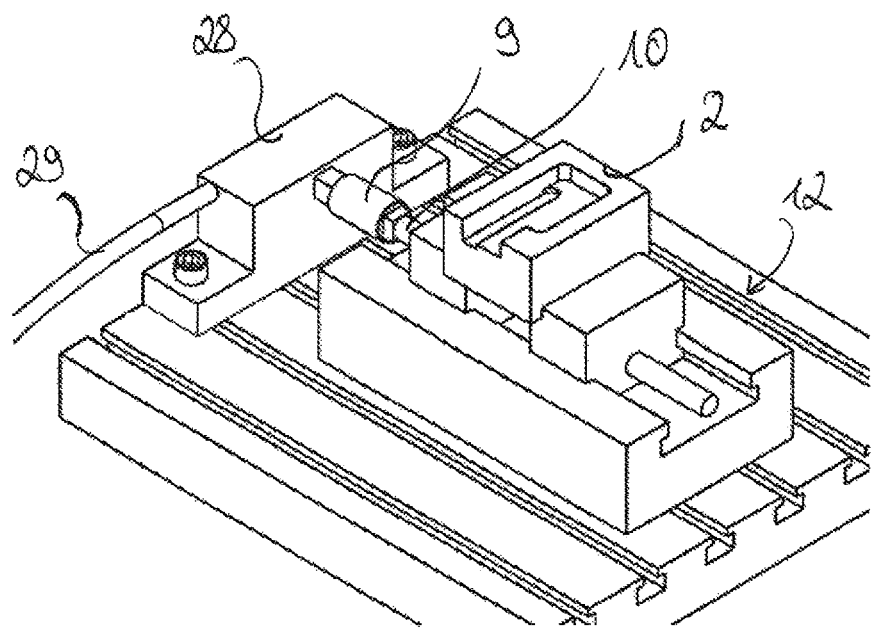
Figure 10:
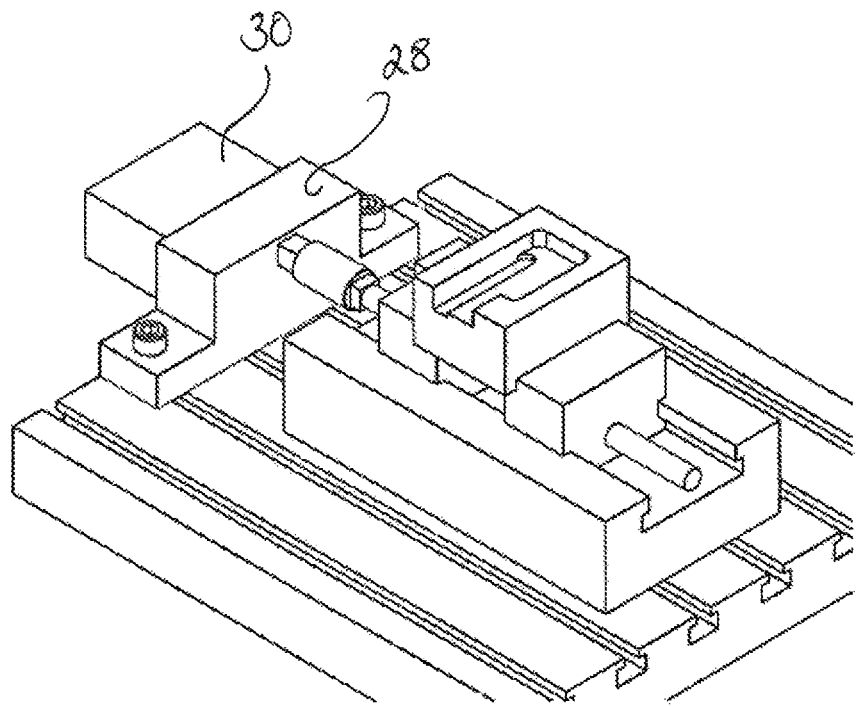

FIG. 1 shows a robot arm with two grippers and a drive unit arranged offset thereto and a clamping device with a workpiece, FIG. 2 shows a robot arm with two grippers and a drive unit arranged in between and a clamping unit with two clamped workpieces, FIG. 3 shows a robot arm with laterally arranged drive unit and laterally arranged gripper and a clamping device with a clamped workpiece, FIG. 4 shows a robot arm with a gripper and a drive unit arranged opposite and a clamping device with clamping claws, FIG. 5 shows a robot arm with a clamping device having two retaining pins and a clamping device with two bores for supporting torque, FIG. 6 shows a robot arm with a drive unit and various exchangeable adapters, FIG. 7 shows a robot arm with a drive unit and adapter depressed against spring force and a clamping device with a workpiece, FIG. 8 shows a robot arm with an adapter engaging on the clamping device and released spring, FIG. 9 shows a clamping device with a drive unit screwed onto the clamping device and FIG. 10 shows a clamping device according to FIG. 9 but with rechargeable battery as power supply.

The device 1 shown in FIG. 1 is used for machining a workpiece 2 using a robot 3 of which only the robot arm 4 with two grippers 5 and 6 and a drive unit 7 is shown. The drive unit 7 has a screwdriver 8 which is connected positively to an adapter 9.

The adapter 9 as moving part of the drive unit is configured to be connected positively to a square 10 in order to exert a torque on the clamping mechanism 11 of the clamping device 12. A rotational movement of the square 10 in one direction results in a clamping of the workpiece 2 whereas a movement in the opposite direction releases the workpiece 2 from the clamping device 12.

In this case, in addition to the oppositely arranged arms 5 and 6, the robot arm 4 can also have the drive unit 7 on the front side and the clamping device 12 can also clamp several workpiece 2, 13 together (cf. FIG. 2).

Depending on the embodiment, the drive unit 5 can also be arranged laterally on the robot arm 4 as shown in FIG. 3.

FIG. 4 shows how a gripper 5 and a drive unit 7 can be arranged oppositely on a robot arm 4. Here the workpieces 2 and 13 are each held with clamping jaws 14, 15, 16, 17 on a clamping plate 18.

The drive unit 19 shown in FIG. 5 has pins 20 or 21 in each case on one side of the screwdriver 8 which are configured so that they can be arranged in alignment with the bores 22, 23 on the clamping device 12 so that the pins 20, 21 slide in the bores 22, 23 and hold the drive unit 19 fixed relative to the clamping device 12 in order to relieve the pressure on the robot arm. It is shown in FIG. 5 that the pins are provided in the drive unit and the bores in the clamping device. In a corresponding design bores can also be provided in the drive device which cooperate with pins in the clamping device. It is thereby avoided that when the adapter 9 engages on the square 10, a torque is applied to the drive unit 19. The adapter 9 only turns the square 10 in order to clamp the workpiece 2 in the clamping device 12.

For this purpose, as shown in FIG. 6, the adapter can be configured as a square adapter 9 or with different adapter profiles 24, 25, 26. These profiles are only examples which can be provided for the respectively corresponding profiles on the clamping device.

It is not ensured that when the adapter 9 is inserted on the square 10, this adapter fits precisely onto the square (cf. FIG. 7). Thus, a spring is provided between adapter 9 and drive unit 7 which enables the adapter 9 to engage with the square 10, as shown in FIG. 8, during a slight movement of the adapter 9 relative to the square 10. In this case, the tension on the spring 27 which presses the adapter 9 to the square 10 is released.

The clamping device 12 shown in FIG. 9 has a drive unit 28 fastened detachably to the clamping device 12 which is supplied with power via a cable 29 in order to turn the square 10 with the adapter 9 in order to clamp the workpiece 2 in the clamping device 12. A pneumatic or a hydraulic drive can also be provided as an alternative to an electrical drive.

FIG. 10 shows that instead of the cable 29 shown in FIG. 9 a rechargeable battery 30 can also be used to supply the drive unit 28 with power. In this case, the drive unit 28 is remote-controlled and in particular radio remote-controlled.

The drive unit 28 can, as shown in FIGS. 9 and 10, be connected via a plate to the clamping mechanism 11 or it can be arranged directly on the clamping mechanism 11.

The invention claimed is:

1. A device for machining a workpiece comprising a robot, which has an arm;
    wherein the robot holds and moves the workpiece;
    wherein the robot has a drive unit which is suitable for fastening the workpiece in a clamping device;
    wherein the drive unit and at least one gripper are arranged simultaneously on the arm of the robot in order to use the drive unit and the at least one gripper one after the other;
    wherein at least one gripper is arranged laterally to the drive unit; and
    wherein the at least one gripper and drive unit are arranged orthogonally to one another;
    wherein the drive unit has two pins, each of the two pins on opposite sides of a screwdriver relative to the other of the two pins, the two pins configured so that the two pins can be aligned flush with two bores on the clamping device; or
    two bores are provided in the drive unit wherein the two bores cooperate with two pins in the clamping device;
    wherein the two pins slide into the two bores and hold the drive unit firmly, relative to the clamping device, in order to relieve the stress on the robot arm.

2. The device according to claim 1, wherein the drive unit has an additional a screwdriver with an adapter having an adapter profile and a spring is provided between the adapter and the drive unit which enables the adapter to enter into engagement with the profile on the clamping device with a small movement of the adapter relative to a corresponding profile on the clamping device, wherein the tension on the spring which presses the adapter towards the profile of the clamping device is released.

3. An arrangement of
    the device according to claim 1; and
    a clamping device;
    wherein the clamping device is configured without a motor and the clamping device and a plurality of pin connections of the drive unit are connected positively to one another.

4. The arrangement according to claim 3, wherein the clamping device receives a plurality of workpieces which are braced together.

5. The arrangement according to claim 3, wherein the clamping device and a moving part of the drive unit are connected positively to one another.

6. A method for machining a workpiece using the arrangement according to claim 3 in which the workpiece is placed by the robot in the clamping device and is then machined, wherein the workpiece is fixed in the clamping device using the robot.

7. The method according to claim 6, wherein the workpiece is released from the clamping device by means of the robot.

\* \* \* \* \*